J. W. WRIGHT.
CALCULATING GUY RULE.
APPLICATION FILED JAN. 22, 1918.
1,429,264.
Patented Sept. 19, 1922.
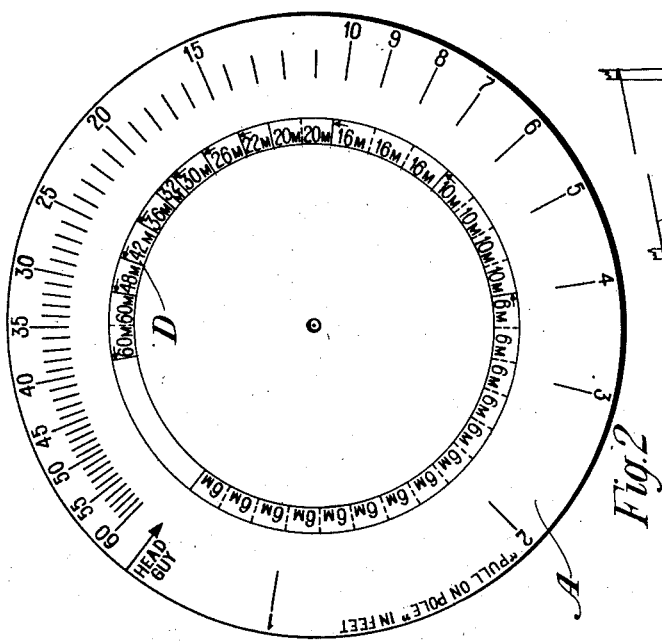
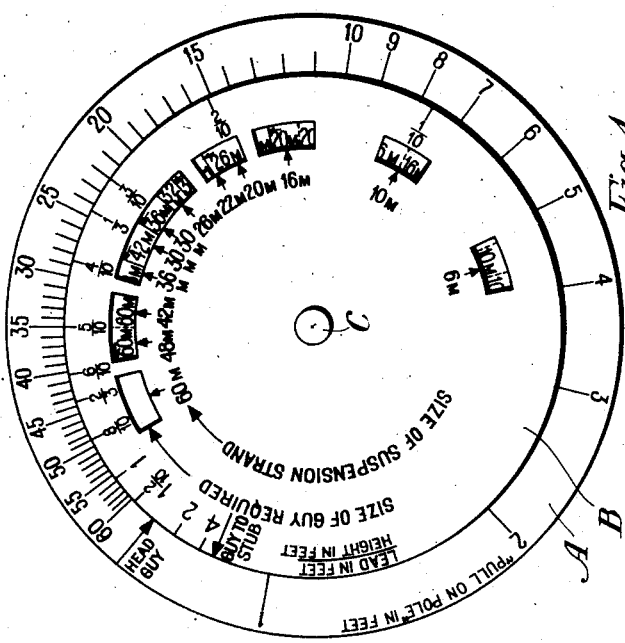
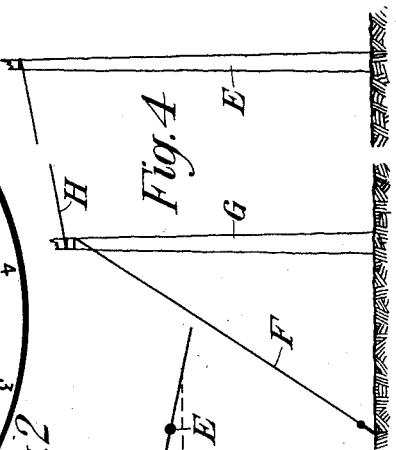
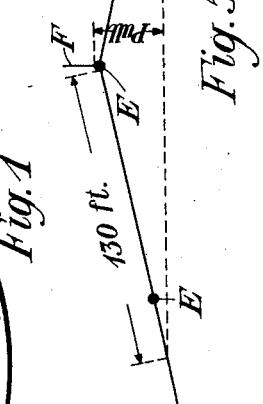
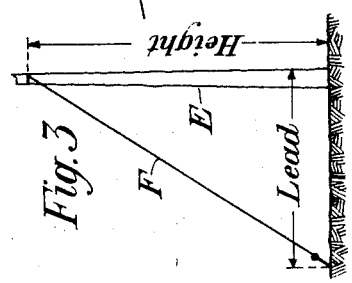
INVENTOR.
J. W. Wright
BY
ATTORNEY Patented Sept. 19, 1922.

1,429,264

UNITED STATES PATENT OFFICE.

JOHN W. WRIGHT, OF PHILADELPHIA, PENNSYLVANIA, ASSIGNOR TO AMERICAN TELEPHONE AND TELEGRAPH COMPANY, A CORPORATION OF NEW YORK.

CALCULATING GUY RULE.

Application filed January 22, 1918. Serial No. 213,177.

*To all whom it may concern:*

Be it known that I, JOHN W. WRIGHT, residing at Philadelphia, in the county of Philadelphia and State of Pennsylvania, have invented certain Improvements in Calculating Guy Rules, of which the following is a specification.

This invention relates to calculating instruments and is concerned particularly with a device for determining the material to be used in a given situation as, for instance, the size of wire to be used in guying electrical pole line construction.

In the construction of telegraph or telephone transmission lines using poles, it is frequently necessary to guy the pole line due to changes in direction, etc. The strength of the strand required to properly guy the line at a particular point depends in general upon three factors: (a) the tension on the poles due to the transmission wires; (b) the amount of the corner to be guyed, and (c) the angle formed by the guy and the pole or the slant of the guy. In the course of construction of lines in the field, it is customary to guess at the strength of guy required for a given case and to allow a liberal factor of safety, resulting almost always in a very considerable wastage of material due to use of excessively large guys. To accurately calculate the requirements for each case requires too much time and since there is an infinite variety of conditions to be met, it is impossible to have a table previously prepared to meet all requirements. It is the object of the present invention to avoid difficulties of this character by providing a device which will show at a glance the unknown characteristic of a material to be employed as, for instance, the proper size of guy strand for a given situation.

The invention will be more fully understood by reference to the accompanying drawing showing the invention embodied in an instrument for indicating guy strengths and in which Figure 1 illustrates the device as set for a given computation. Figure 2 shows the device with the upper disc removed, and Figures 3, 4 and 5 are diagrammatic illustrations of features of a pole line construction necessary to explain the use of the invention.

The instrument consists of two concentric discs A and B pivoted to turn one upon the other at their common centre C. The available guys used in line construction, indicated by their strength in thousands of pounds, are represented on the larger disc at D, arranged in a circular scale concentric with the pivot C. These readings range, it will be seen, from 6000 pounds to 60,000 pounds. Around the peripheries of the two discs are arranged other scales representing the various possible values of the three variables which determine the size of strand required in any given case and these are disposed in such relation, one to another, that by a proper adjustment of the discs the size of guy strand can be read off.

On the edge of the disc A, outside of the circle showing the various sizes of guy strands, is a logarithmic scale labeled "Pull on pole in feet," this being the term used in the field to designate the amount of the corner to be guyed. The method of determining this "pull" in a given case will be evident from Figure 5 which indicates a plan view of a corner, in which E, E, E indicate the supporting poles. For convenience the "pull in feet" is figured upon the basis of an isosceles triangle having equal sides of 130 feet measured from the corner pole along the transmission line in either direction. The "pull in feet" will then be represented by the perpendicular distance between the base of this triangle and the corner pole,—a measurement relatively easy to make,—and, as it is proportional to the cosine of half the angle to be guyed or, in the parallelogram of forces, half the line representing the pull in the direction of the guy, it will, on the scale, properly represent this variable for all angles.

On the outer edge of the smaller disc is a scale labeled $$\frac{\text{Lead in feet}}{\text{Height in feet}}\text{.''}$$

This ratio is illustrated in Figure 3 in which a guy F is represented, attached to the pole E, "height" being the perpendicular distance from the ground to the point of attachment of the guy to the pole and "lead" being the distance from the pole to the guy measured from the base of the height line and perpendicular thereto. If the ground is sloping the base of the height line is at the level where the pole or the guy enters the ground, depending upon which is the higher level. This scale shows values for this ratio ranging from $\frac{1}{10}$ to $\frac{4}{1}$. Where the lead is more than 4 times the height, the guy may be treated as if it extended approximately horizontally as will appear hereinafter.

The disc B has also a second scale here shown as located within the scale last described and labeled "Size of suspension strand." This scale is composed of a series of characters representing the tensional strengths of the various suspension strands used for supporting telephone cables and the like, upon pole lines. M as used in the scale indicates 1,000, so that 6M represents 6,000. 10M represents 10,000 and so on up to 60M or 60,000. It will be understood that in some instances a combination of two or more strands may be used to support the cable or cables upon the pole line to be guyed, and that in this case their total strength is the figure to be used.

The outer disc contains a slot, or a series of slots, as here illustrated, arranged on a line concentric with the discs through which the scale on disc A representing the size of guy wires may be observed, and for convenience the legend "Size of guy required" may be placed on disc B in line with the slots, as indicated in Figure 1. The scale "Size of guy required" on disc A, and the scale "Size of suspension strand" on disc B, are so arranged as to lie adjacent each other when the former is viewed through the slots in the disc B which are properly positioned for this purpose. This enables the size of guy to be easily read against the size of suspension strand used. If transparent material is used or if the scales are disposed in other ways obviously possible, the slots will, of course, be unnecessary.

At the upper end of the scale "Pull on pole in feet" is a graduation label "Head guy" and at the upper end of the scale $$\frac{\text{"Lead in feet}}{\text{Height in feet"}}$$

is a graduation labeled "Guy to stub". A head guy is one whose pull on the pole is in substantially the direction of the line, instead of at an angle thereto, and since it is designed to carry the entire pull, it will be seen that it must be equivalent in size to the corner guy where the pull on the pole is $\frac{1}{2}$ of 130 or 65 feet, the corner guy, of course, carrying the pull of two strands at this angle. The "Head guy" graduation is, therefore, at approximately the point which would be occupied by 65 if the scale were extended that far. A "Guy to stub" is a guy extending approximately horizontally from the pole to an auxiliary pole or stub, as in Figure 4 where G represents the stub and H the guy. The stud, in turn, is guyed to the ground, the purpose being to carry the guy wire over a roadway or the like. Such a guy will either be horizontal or so nearly so that the ratio of lead to height, if measured as above described, would be greater than $\frac{4}{1}$. It will be seen that the location of the "Guy to stub" graduation is slightly beyond the position of 4 on this scale.

To illustrate the operation of the device, let it be assumed that it is desired to calculate the size of guy for a corner in which the pull on the pole in feet is 35 and in which the ground connection of the guy will be so located, with respect to the pole, that the ratio of "lead" to "height" is $\frac{1}{2}$; and in which the poles carry a cable strung on a suspension strand of 26,000 pounds. First rotate the upper disc to set the $$\frac{\text{"Lead in feet}}{\text{Height in feet"}},$$

namely $\frac{"5"}{10}$, on the scale shown, opposite 35 in the scale "Pull on pole in feet." This adjustment is illustrated in Figure 1. Next find on the scale "Size of suspension strand" the figure corresponding to the strand in use, namely, 26M. Then read opposite this through the slot the size of guy required, or 32M, that is a 32,000 pound strand. To determine the size of a head guy the operation is the same except the ratio of lead to height will be set opposite the graduation head guy on the outer scale of the larger disc. To determine the size of a guy to a stub pole or a side guy where the ratio of lead to height is greater than 4, the graduation on the smaller disc labeled "guy to stub" is set opposite the ascertained pull on the pole in feet and the size of guy is then read opposite the known size of suspension strand as in the first operation described. In calculating the size of a guy to ground from a stub pole, the guy is to be regarded as a "head guy" and the "size" of suspension strand" used in the calculation will be the size of the "guy to stub" which has been previously calculated as just described. With this understanding, such a guy is calculated in the same manner as any other head guy.

It will be understood that modifications in details herein shown, such as the arrangement of the scales, the openings in the upper disc, etc., may be made without departing from the spirit of the invention and that by a proper substitution of values in the inner scale on the small disc the device may be adapted for calculations other than those relating to poles carrying cable lines.

What is claimed is:

A calculating device comprising a lower member provided near its edge with a set of graduations, an upper member movable thereover and provided at its edge with a set of graduations co-operating with said graduations on the lower member, a second set of graduations on said upper member consisting of progressively increasing but nonconsecutive values depending upon the practical limitations of the problem to be solved, said upper member having a series of openings opposite the several graduations of said last named series, a second set of graduations on said under member arranged to be read through said openings and also comprising a set of progressively increasing but nonconsecutive values, and marks indicating the value of such last named graduations which marks are repeated when the graduation is greater in extent than the opening through which it must be read, so that one or more marks shall always appear through the opening.

In testimony whereof, I have signed my name to this specification this 12th day of January, 1918.

JOHN W. WRIGHT.